June 17, 1952  J. M. WRIGHTSON  2,600,821
PROCESS FOR POLYMERIZING TRIFLUOROCHLOROETHYLENE
Filed March 30, 1948
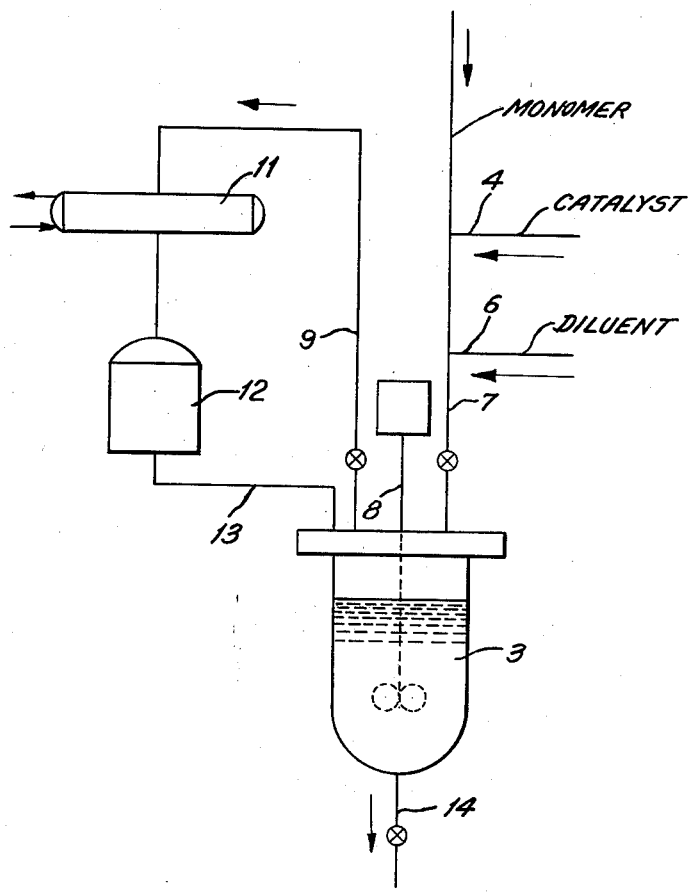
INVENTOR.
JOHN M. WRIGHTSON
BY E. F. Liebrecht
Cruzan Alexander
ATTORNEYS Patented June 17, 1952

2,600,821

UNITED STATES PATENT OFFICE 2,600,821

PROCESS FOR POLYMERIZING TRIFLUORO-CHLOROETHYLENE

John M. Wrightson, North Bergen, N. J., assignor to The M. W. Kellogg Company, Jersey City, N. J., a corporation of Delaware Application March 30, 1948, Serial No. 17,863

9 Claims. (Cl. 260—92.1)

This invention relates to the manufacture of perhalocarbons. In one of its aspects, this invention relates to the polymerization of trifluorochloroethylene to produce a normally solid polymer of high chemical and physical stability.

Under suitable reaction conditions trifluorochloroethylene can be polymerized to produce a normally solid polymer or plastic of good physical and chemical properties and suitable for molding articles of manufacture. At the present time, polymerization of trifluorochloroethylene to produce solid polymers is effected in a batch manner in a bomb type reaction vessel. The monomer is introduced into the bomb together with a suitable promoter and polymerization is effected therein at a temperature of about −16° C. for a period of about seven days. The monomer in the bomb is converted to a porous plug of solid polymer with approximately 33 per cent yield of polymer based on the monomer charged. Unreacted monomer is occluded in the interstices of the porous plug and is removed therefrom by heating the reaction vessel to evaporate the monomer from the solid polymer plug. After the monomer has been evaporated from the polymer plug, the plug is removed from the reaction vessel, broken into chips or granules and then molded for the desired purpose.

The apparatus currently employed to effect the process described above is a cylindrical vessel or bomb approximately 6 inches in inside diameter surrounded by a cooling liquid. Because of the poor heat transfer of the polymer it is necessary to maintain the cooling bath and thereby the reaction vessel at a temperature materially below the optimum polymerization temperature to avoid overheating of the reactants and polymer in the center of the reaction vessel. Experiments in vessels of smaller diameter have indicated that the temperature can be increased and hence the average temperature of the material, without increase in the maximum temperature of the material at the center of the vessel. An increase in the average temperature of polymerization increases the rate of polymerization and results generally in a shorter period of time to obtain an economic yield of solid polymer product. There is also indication that the quality of the solid polymer produced at the higher temperatures with the smaller vessels is improved as the result of the greater uniformity of temperature characterized by these smaller vessels. However, reduction in the diameter of the reaction vessel or bomb reduces the amount of material which can be produced for a given charge since the length of the vessel must be limited to enable easy removal of the solid polymer plug. It is, therefore, much to be desired to provide a method and apparatus for overcoming the above inherent difficulties of heat transfer in the production of normally solid polymers of trifluorochloroethylene.

The object of this invention is to provide a method for removing the heat of polymerization during the polymerization of trifluorochloroethylene.

Another object of this invention is to provide a process for the polymerization of a fluorochloro-olefin to produce a normally solid polymer.

Another object is to provide a method and apparatus for improving the quality of solid polymers produced from trifluorochloroethylene.

Still another object of this invention is to provide a method for adequate control of the temperature of reaction in the polymerization of trifluorochloroethylene.

Various other objects and advantages of the present invention will become apparent to those skilled in the art from the accompanying description and disclosure.

As herein employed, a perhalocarbon is defined as a compound consisting substantially of carbon and halogen with any degree of saturation. A fluorochloro-olefin is defined as a perhalocarbon, particularly a perhalo-olefin, with any degree of unsaturation consisting of fluorine, carbon, and as regards this invention not more than one chlorine atom per atom of carbon.

According to this invention, a perfluorochloro-olefin, particularly trifluorochloroethylene, is polymerized in the presence of a liquid diluent which is evaporated under the conditions of polymerization whereby the heat of polymerization is removed as latent heat of vaporization.

A diluent suitable for the above purpose according to the teachings of this invention is a liquid which has a boiling point below that of the monomer which is about −26 to −28° C. at atmospheric pressure, preferably a boiling point at least 10° C. below that of the monomer at the pressures and temperatures employed during the polymerization. It is preferred that the diluent have a boiling point not more than 100° C. below that of the monomer for best results according to this invention. Furthermore, the diluent must be one which does not have injurious effect on the desired polymerization reaction and preferably the diluent is substantially inert or non-reactive, although the use of a diluent in the manner described herein which enters into the reaction or acts as a promoter is within the scope of this invention. A particularly suitable diluent is a saturated low-boiling hydrocarbon, such as ethane or propane, because the diluent is immiscible with the polymer product. Other diluents comprise saturated halogenated hydrocarbons, such as trifluorochloromethane, trifluoromethane, difluorodichloromethane, chlorodifluoromethane, methyl fluoride, chloropentafluoroethane, hexafluoroethane, trifluorooethane, and ethyl fluoride. Unsaturated compounds are undesirable because they polymerize under the reaction conditions of this invention and thus contaminate the product. Oxygen-containing compounds and the amines are also undesirable as diluents because they inhibit the polymerization of trifluorochloroethylene.

The quantity of diluent employed is in a volume ratio of liquid diluent to liquid monomer charged of about 1:1 to about 10:1, preferably about 2:1 to about 3:1. Using a diluent such as propane in the preferred ratio results in a permissible increase in the polymerization reaction temperature for the production of solid polymers of at least 10° C. as the result of the uniform conditions of temperature maintained throughout the polymerization reaction mixture. The temperature may be raised as high as room temperature when using superatmospheric pressures without adverse effect upon the chemical and physical characteristics of the solid polymer produced and with greatly shortened time of polymerization required.

For a better understanding of the present invention reference will be made to the accompanying drawing which diagrammatically illustrates an arrangement of apparatus in elevation for the production of normally solid polymers of trifluorochloroethylene. According to the drawing the trifluorochloroethylene monomer is intrduced into the reaction vessel or bomb 3 through conduit 7. A suitable catalyst or promoter, such as an organic peroxide, to be discussed more fully later is also introduced into reaction vessel 3 through conduits 4 and 7. Simultaneously or after the introduction of the monomer and catalyst a suitable diluent, such as propane, is introduced under pressure into reaction vessel 3 through conduits 6 and 7. The amount of propane introduced is about 3:1 on a volume ratio basis with regard to the monomer charged. After the reaction vessel has been charged with the monomer promoter and diluent, the vessel is sealed and maintained at a reaction temperature of about 0° C. and at a pressure of about 68 pounds per square inch gage, which corresponds to the vapor pressure of propane at 0° C. The liquid phase of monomer, diluent and promoter is agitated by means of stirrer 8 and the reaction effected. Upon the liberation of heat of polymerization, propane is evaporated at the above designated temperature and pressure conditions whereby the heat of polymerization is absorbed as latent heat of vaporization. Vapors of propane are continuously passed from reaction vessel 3 through conduit 9 to condenser 11. In condenser 11 the propane is condensed at the prevailing pressure and the heat of vaporization removed therefrom. Condensate is passed from condenser 11 to accumulator 12. From accumulator 12 the liquid propane is returned to reaction vessel 3 continuously or intermittently by means of a pump, not shown.

As the polymerization progresses, particles of solid polymers are formed and are suspended in the reaction mixture in vessel 3. These solid particles may be retained in vessel 3 and at the end of a predetermined polymerization period allowed to settle and removed therefrom through conduit 14. In one embodiment the solid particles of polymer are continuously removed as formed from vessel 3 as a slurry with unreacted monomer and diluent. This slurry is passed through a settling zone or a conventional filter for removal of the solid polymers. Thereafter the liquid comprising diluent and unreacted monomer is recycled to reaction vessel 3. In this latter embodiment fresh monomer and catalyst may be continuously introduced into the reaction vessel.

The monomer trifluorochloroethylene is prepared by the dechlorination of trifluorotrichloroethane in the presence of zinc dust and a solvent for the metal halide formed. A suitable temperature of reaction for the dechlorination reaction for preparing the monomer is between about 0° C. and about 150° C. and a corresponding pressure to maintain the trifluorotrichloroethane in the liquid phase. Suitable solvents for the dechlorination of trifluorotrichloroethane comprise water, methyl ethyl, n-propyl and n-butyl alcohols, dioxane, glycerol, butyl carbitol and the cellosolves.

In the polymerization of trifluorochloroethylene to produce normally solid polymers, various organic peroxides may be used as the promoter, preferably dissolved in a solvent to facilitate handling and mixing in the reaction zone. Such organic peroxides comprise bistrichloroacetyl peroxide, trifluoroacetyl peroxide, difluorochloroacetyl peroxide, benzoyl peroxide, chloroacetyl peroxide, and dichlorofluoroacetyl peroxide. The preferred promoter is bis-trichloroacetyl peroxide. Suitable solvents for dissolving the solid organic peroxide promoter comprise trichlorofluoromethane, difluorodichloromethane, trifluorochloromethane, pentafluorochloroethane, trichlorotrifluoroethane, dichloroperfluorocyclobutane, and perfluoroheptane.

When using bis-trichloroacetyl peroxide, between about 0.01 and about 0.15 per cent of the peroxide based on the monomer charged is employed. A reaction temperature between about −20° C. and about 150° C. is suitable for producing normally solid products, preferably a reaction temperature between about −15 and about 25° C. The pressure employed corresponds to the pressure required at the predetermined polymerization temperature to maintain the diluent in a state of boiling in the reaction zone so as to remove the heat of polymerization as latent heat of vaporization of the diluent. The pressure employed is thus equivalent to the vapor pressure of the diluent at the desired polymerization temperature.

After recovery of the normally solid polymer, the polymer may be further treated, such as by fluorination or pyrolysis, without departing from the scope of this invention.

In some instances it may be desirable to cool the reaction vessel by indirect heat exchange as well as by the vaporization of the diluent. In such circumstances the vessel may be surrounded by a cooling medium such as a naphtha, maintained at a desired low temperature. A conventional cooling coil may also be used, which coil may be inserted in the reaction mixture or surround the reaction vessel itself.

Nitrogen or other inert gas may be used to pressure up the system by injecting a stream into the vapor space in the reaction vessel without departing from the scope of this invention.

As used herein in its broadest sense, the term polymerization includes co-polymerization of perhalo-olefins.

As the process of this invention can be applied to the polymerization of other perchlorofluoro-olefin whose physical and chemical characteristics lend themselves to the invention described, the specific examples of conditions, reactants and materials would not be construed as to unnecessarily limit the invention. Certain control equipment, such as temperature controls, pressure controls, liquid level controls and storage facilities have been omitted from the drawing as a matter of convenience and clarity.

Having described my invention, I claim:

1. The process for polymerizing trifluorochloroethylene to produce a normally solid polymer of superior chemical and physical characteristics which comprises polymerizing trifluorochloroethylene in a reaction zone in the presence of a polymerization promoter comprising a halogen substituted acyl peroxide and a liquid diluent selected from the group consisting of a saturated hydrocarbon and a saturated halogenated hydrocarbon having a boiling point at least 10° C. lower than the monomer at a temperature of polymerization between about −20 and about 25° C. and at a pressure corresponding substantially to the vapor pressure of the diluent at said polymerization temperature whereby heat of polymerization of said trifluorochloroethylene is removed as latent heat of vaporization of said diluent, the quantity of diluent employed being a volume ratio of liquid diluent to liquid monomer of about 1:1 to about 10:1, and maintaining the monomer and diluent in admixture as a pool of liquid substantially co-extensive with said reaction zone.

2. The process of claim 1 in which said diluent is a saturated hydrocarbon.

3. The process of claim 1 in which said diluent is a saturated halogenated hydrocarbon.

4. The process of claim 1 in which said diluent is propane.

5. The process of claim 1 in which said diluent is trifluorochloromethane.

6. The process of claim 1 in which said diluent is difluorodichloromethane.

7. The process for polymerizing trifluorochloroethylene to produce a normally solid polymer of superior chemical and physical characteristics which comprises polymerizing trifluorochloroethylene in a reaction zone in the presence of a polymerization promoter comprising bis-trichloroacetyl peroxide and a liquid diluent selected from the group consisting of a saturated hydrocarbon and a saturated halogenated hydrocarbon having a boiling point at least 10° C. lower than the monomer at a temperature of polymerization between about −20 and about 25° C. and at a pressure corresponding substantially to the vapor pressure of the diluent at said polymerization temperature whereby heat of polymerization of said trifluorochloroethylene is removed as latent heat of vaporization of said diluent, the quantity of diluent employed being a volume ratio of liquid diluent to liquid monomer of about 1:1 to about 10:1, and maintaining the monomer and diluent in admixture as a pool of liquid substantially coextensive with said reaction zone.

8. The process for polymerizing trifluorochloroethylene to produce a normally solid polymer of superior chemical and physical characteristics which comprises polymerizing trifluorochloroethylene in a reaction zone in the presence of a polymerization promoter comprising bis-trichloroacetyl peroxide and propane as a diluent at a temperature of polymerization between about −20° C. and about 25° C. and at a pressure corresponding substantially to the vapor pressure of the diluent at said polymerization temperature whereby heat of polymerization of said trifluorochloroethylene is removed as latent heat of vaporization of said diluent, the quantity of diluent employed being a volume ratio of liquid diluent to liquid monomer of about 1:1 to about 10:1, and maintaining the monomer and diluent in admixture as a pool of liquid substantially coextensive with said reaction zone.

9. The process of claim 8 in which said polymerization temperature is about 0° C. and said pressure is about 68 pounds per square inch gage.

JOHN M. WRIGHTSON.

REFERENCES CITED

The following references are of record in the file of this patent:

UNITED STATES PATENTS

| Number | Name | Date |
| --- | --- | --- |
| 1,955,873 | Deanesly | Apr. 24, 1934 |
| 2,393,967 | Brubaker | Feb. 5, 1946 |

FOREIGN PATENTS

| Number | Country | Date |
| --- | --- | --- |
| 796,026 | France | Mar. 27, 1936 |

OTHER REFERENCES

De Bell et al.: "German Plastics Practice," page 30, De Bell & Richardson (1946).